(12) United States Patent
Veitch et al.

(10) Patent No.: US 6,835,450 B2
(45) Date of Patent: Dec. 28, 2004

(54) MAGNETIC RECORDING MEDIUM

(75) Inventors: Ronald John Veitch, Maxdorf (DE); Albert Kohl, Laumersheim (DE); Helmut Jakusch, Frankenthal (DE); Andreas Ilmer, Ludwigshafen (DE); Peter Heilmann, Bad Dürkheim (DE); Ria Kress, Ludwigshafen (DE); Stefan Müller, Willsätt (DE); Johannes Sandrock, Kehl (DE)

(73) Assignee: Imation Corp., Oakdale, MN (US)

( * ) Notice: Subject to any disclaimer, the term of this patent is extended or adjusted under 35 U.S.C. 154(b) by 235 days.

(21) Appl. No.: 09/826,932

(22) Filed: Apr. 6, 2001

(65) Prior Publication Data
US 2002/0012815 A1 Jan. 31, 2002

(30) Foreign Application Priority Data
Apr. 7, 2000 (DE) .......................... 100 17 489

(51) Int. Cl.[7] .............................. B32B 5/16; G11B 5/66; G11B 5/70; B29C 71/02; H01F 1/00
(52) U.S. Cl. ................. 428/329; 428/336; 428/694 BS; 428/694 BA; 428/694 BM; 428/694 BH; 427/541; 427/544; 427/547; 427/548; 427/550
(58) Field of Search ................... 428/323, 328, 428/329, 332, 403, 405, 694 BS, 694 BA, 694 BM, 694 BH, 336; 427/541, 544, 547, 548, 550

(56) References Cited

U.S. PATENT DOCUMENTS

| 4,329,241 A | 5/1982 | Massart ................... 252/62.52 |
| 5,601,647 A | 2/1997 | Pertzsch et al. ............ 118/419 |
| 5,704,978 A | 1/1998 | Maniwa et al. ............. 118/410 |
| 5,858,097 A | 1/1999 | Richter et al. ............. 118/411 |
| 5,916,539 A | 6/1999 | Pilgrimm ................. 424/9.322 |
| 5,928,958 A | 7/1999 | Pilgrimm .................... 436/526 |
| 6,030,689 A | 2/2000 | Matsubaguchi et al. .... 428/141 |
| 6,143,403 A | 11/2000 | Ejiri et al. .................. 428/323 |
| 6,274,121 B1 | 8/2001 | Pilgrimm .................. 424/9.42 |
| 6,440,545 B1 | 8/2002 | Hisano et al. .............. 428/216 |

FOREIGN PATENT DOCUMENTS

| CA | 1066483 | 11/1979 |
| DE | 2642383 | 3/1977 |
| DE | 3027012 | 2/1981 |
| DE | 4427821 | 2/1996 |
| DE | 9504930 | 8/1996 |
| EP | 0654165 | 5/1995 |
| FR | 2734500 | 11/1996 |

OTHER PUBLICATIONS

English Language Abstract of DE 44 27 821.
English Language Abstract of JP 57175734.
Seiichi Hisano et al., "Research and Development of Metal Powder for Magnectic Recording", Journal of Magnetism and Magnetic Materials, vol. 190, pp. 371–381 (1998).

*Primary Examiner*—Sheeba Ahmed
(74) *Attorney, Agent, or Firm*—Eric D. Levinson

(57) ABSTRACT

Multilayer magnetic recording medium is suitable for high recording densities and the recording of digital data, has very good electromagnetic recording properties in the entire recording wavelength range and good mechanical properties and possesses a flat frequency response and which has at least one upper magnetic recording layer less than 0.5 μm thick and at least one lower layer which contains a magnetically soft pigment.

24 Claims, 2 Drawing Sheets

1 - conventional tape-like recording medium

2 – Novel tape-like recording medium

Frequency response: (1) Example n5
(2) Example p1

MAGNETIC RECORDING MEDIUM

CROSS-REFERENCE TO RELATED APPLICATIONS

The present application claims priority under 35 U.S.C. § 119 of German Patent Application No. P 100 17 489.2, filed Apr. 7, 2000, the disclosure of which is expressly incorporated by reference herein in its entirety.

BACKGROUND OF THE INVENTION

1. Field of the Invention

The present invention relates to a magnetic recording medium, in particular a multilayer magnetic recording medium having a thin upper magnetic recording layer which has good electromagnetic recording properties in the entire recording wavelength range, a flat frequency response and good mechanical properties, and a process for its production.

2. Discussion of Background Information

Magnetic recording media, for example magnetic tapes, floppy disks or magnetic cards, have long been known for the recording of analog or digital audio and video signals or for data recording.

There has for some years been an increasing demand for media which are suitable for increasingly high recording densities, i.e., which are capable of storing large quantities of information in a very small space. Increasingly small thicknesses of the recording layer and magnetic pigments having increasingly small dimensions and increasingly high coercive forces are essential for this purpose.

Binder-containing double-layer magnetic media in which production difficulties, arising from the reduction in the thickness of the upper recording layer, and mechanical stability problems can be compensated by a relatively thick lower layer without having to dispense with a high recording density became established some time ago. They have higher stability and better productivity during manufacture compared with the magnetic recording media of the ME (metal evaporated) type, which are also known and are very suitable for high recording densities.

For information storage, they have a very smooth magnetic upper layer which is generally less than 0.5 $\mu$m thick and comprises magnetic pigments having a high coercive force, preferably metal pigments or pigments comprising metal alloys. A thicker, likewise pigmented, binder-containing lower layer is present between the generally nonmagnetic substrate and the magnetic recording layer.

The lower layers used here are layers which contain both magnetic and nonmagnetic inorganic pigments, as well as layers which contain only nonmagnetic pigments in addition to binders and conventional additives. The recent developments of magnetic recording media have concentrated mainly on the refinement of this concept of metal pigment magnetic media in double-layer technology. For example, it was proposed to use novel metal pigments having a higher coercive force, improved uniformity and dispersibility (S. Hisano and K. Saito, Research and Development of Metal Powder for Magnetic Recording, J. Magn. Mat., 190 (1998), 371–381). By means of this technology, it was possible to achieve the quality of ME recording media with a 100 nm thick upper-layer containing metal powder and binder. However, the upper layer containing metal powder is still relatively thick compared with sputtered hard disk layers, in spite of its reduction in layer thickness. As a result of this, the layers containing metal powder have large stray magnetic signal fields at long recording wavelengths.

The magnetoresistive heads used for modern recording media and high recording densities were however originally developed for hard disks and have high sensitivity. Consequently, large stray magnetic signal fields can lead to saturation problems on the heads, with the result that weaker signal levels can no longer be read or signal distortions occur.

As a solution to this problem, it was proposed to use extremely thin upper layers having a thickness of only 55 nm. However, it is not clear whether such thin coatings can be produced at all in the case of recording media containing particulate metal powder. At a typical metal pigment particle thickness of about 20 nm, only three particles at most would fit one on top of the other in such layers, which would lead to considerable technical difficulties in the production process.

The usual way of solving this problem for layer thicknesses which can currently be produced is to write additional pulses for long wavelengths at which head saturation and, associated therewith, signal distortion would occur, i.e., to perform a write equalization.

At a high recording speed, however, the head and the electronics of the recording apparatus are subject to a considerable load as a result of this process, since a very much higher switching frequency of the write field is required. To date, the literature has not described any method of solving the saturation problem in magnetoresistive read heads for particulate recording media in such a way that cheap products can be produced in large quantities thereby.

SUMMARY OF THE INVENTION

The present invention relates to providing a magnetic recording medium which has good electromagnetic properties in the entire recording wavelength range and good mechanical properties, is suitable for recording digital data and can be produced using conventional technologies and in which the problem of head saturation does not occur.

The present invention also relates to providing a process for the production of such a magnetic recording medium.

According to the present invention, there is provided a multilayer magnetic recording medium which comprises, on a nonmagnetic substrate, at least one upper binder-containing magnetic recording layer which has a thickness of less than 0.5 $\mu$m and contains a finely divided magnetic pigment having a coercive force $H_c$ of 80–250 kA/m, and at least one lower binder-containing layer which contains an isotropic magnetically soft pigment which is selected from $\gamma$-$Fe_2O_3$, $Fe_3O_4$ and a solid solution of these components, the coercive force $H_c$ of the lower layer being less than 4 kA/m and the anhysteretic susceptibility of the lower layer at 2 kA/m being greater than 7.

Furthermore, the present invention is directed to a process for the production of a multilayer magnetic recording medium, which comprises:

mixing, kneading and dispersing an isotropic magnetically soft pigment which is selected from $\gamma$-$Fe_2O_3$, $Fe_3O_4$ and a solid solution of these components, a binder, a solvent and further additives and applying the dispersion to a nonmagnetic substrate, a lower layer forming;

mixing, kneading and dispersing a finely divided magnetic pigment having a coercive force $H_c$ of 80–250 kA/m with a binder, a solvent and further additives and applying the dispersion to the lower layer, an upper magnetic recording layer forming;

orienting the moist layers in a magnetic field;
drying the moist layers until the upper layer reaches a thickness of less than 0.5 µm; and
subsequently calendering and separating,
so that the coercive force of the lower layer is less than 4 kA/m and the anhysteretic susceptibility of the lower layer at 2 kA/m is greater than 7.

The coercive force $H_c$ of the pigment in the upper layer can be from 130 to 220 kA/m.

The magnetic pigment in the upper layer can be a metal pigment or metal alloy pigment.

The magnetic pigment in the upper layer can be a hexagonal ferrite pigment or a Co-modified $\gamma\text{-Fe}_2\text{O}_3$, a Co-modified $\text{Fe}_3\text{O}_4$ or a solid solution of these components.

The isotropic magnetically soft pigment in the lower layer can have a mean crystallite size of from 7 to 17 nm.

The amount of the magnetically soft pigment in the lower layer can be more than 45% by weight, or more than 75% by weight, based on the weight of all pigments in the lower layer.

The magnetically soft pigment in the lower layer can be surface-treated with an aluminum compound or with a silicon compound or with a mixture of the two compounds.

The magnetic pigment in the lower layer can be spherical, cubic or amorphous.

The lower layer can contain at least one nonmagnetic pigment in addition to the magnetically soft pigment. The nonmagnetic pigment can be acicular, having a mean longitudinal axis of from 5 to 200 nm, or spherical or amorphous, having a mean particle size of from 5 to 350 nm. The nonmagnetic pigment can be $\alpha\text{-Fe}_2\text{O}_3$ or carbon black, or a mixture thereof.

The present invention is also directed to a process for forming a multilayer magnetic recording medium which comprises, on a nonmagnetic substrate, at least one upper binder-containing magnetic recording layer which has a thickness of less than 0.5 µm and contains a finely divided magnetic pigment having a coercive force $H_c$ of 80–250 kA/m, and at least one lower binder-containing layer which contains an isotropic magnetically soft pigment which is selected from $\gamma\text{-Fe}_2\text{O}_3$, $\text{Fe}_3\text{O}_4$ and a solid solution of these components, the coercive force $H_c$ of the lower layer being less than 4 kA/m and the anhysteretic susceptibility of the lower layer at 2 kA/m being greater than 7, which comprises adding as the isotropic magnetically soft pigment in the lower layer at least one of $\gamma\text{-Fe}_2\text{O}_3$, $\text{Fe}_3\text{O}_4$ and a solid solution of these components, and which has a mean crystallite size of from 7 to 17 nm.

The present invention is also directed to a magnetic tape, magnetic card or floppy disk comprising a multilayer magnetic recording medium which comprises, on a nonmagnetic substrate, at least one upper binder-containing magnetic recording layer which has a thickness of less than 0.5 µm and contains a finely divided magnetic pigment having a coercive force $H_c$ of 80–250 kA/m, and at least one lower binder-containing layer which contains an isotropic magnetically soft pigment which is selected from $\gamma\text{-Fe}_2\text{O}_3$, $\text{Fe}_3\text{O}_4$ and a solid solution of these components, the coercive force $H_c$ of the lower layer being less than 4 kA/m and the anhysteretic susceptibility of the lower layer at 2 kA/m being greater than 7.

Surprisingly, the recording medium according to the present invention has a flat frequency response which has lower values at long recording wavelengths than, for example, conventional recording media having the same thickness of the recording layer and of the nonmagnetic lower layer. Consequently, there are no problems of magnetic saturation of the head and associated signal distortion at long wavelengths.

The magnetically soft lower layer partially short-circuits the magnetic flux of the upper layer so that the magnitude of the signal level is reduced. This effect is wavelength-dependent and is most pronounced at long wavelengths. The result is a flattening of the frequency response, the effect of which in the region of long recording wavelengths is that saturation of the magnetorestrictive read head no longer occurs, while only a marginal reduction in the signal level has to be accepted in the region of short recording wavelengths.

The evaluation of the individual data pulses shows that their amplitude is reduced. However, the pulse shape is disproportionately constricted, which leads to a sharper signal which is more readily detectable since the risk of superpositions of the individual pulses is reduced. The novel recording medium is therefore suitable for high recording densities since these require sharp and narrow signals owing to the high recording frequencies, such as can be seen in FIG. 1.

The greater attenuation of the signal level at long wavelengths has the same effect there as the reduction in the thickness of the upper layer. This gives a recording medium whose recording properties correspond to those of a medium having a magnetic recording layer which is thinner than that actually present. This facilitates the production of magnetic media for high recording densities because the thickness of the upper magnetic recording layers can be established by the conventional technologies without complicated and expensive adaptations.

BRIEF DESCRIPTION OF THE DRAWINGS

The present invention is further described in the detailed description which follows, in reference to the noted plurality of drawings by way of non-limiting examples of exemplary preferred embodiments of the present invention, in which like reference numerals represent similar parts throughout the several views of the drawings, and wherein.

DETAILED DESCRIPTION OF THE PRESENT INVENTION

Figure 1:
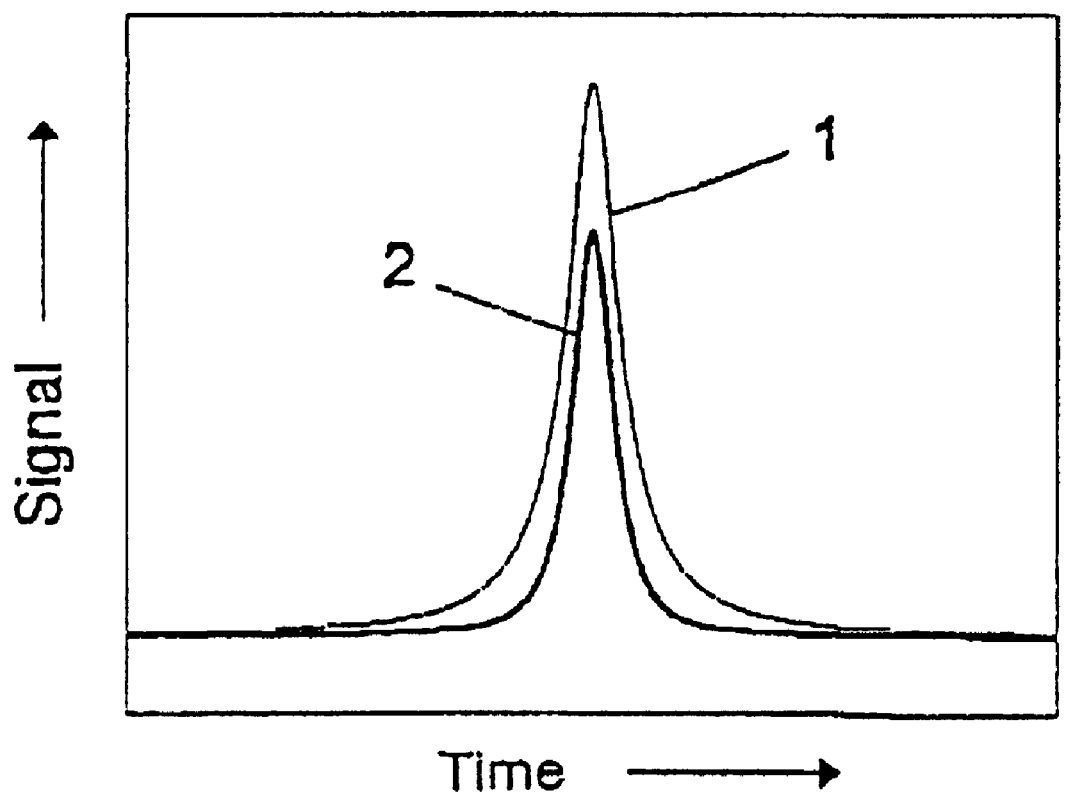
FIG. 1: shows the individual read pulses of a conventional tape-like recording medium (1) and of a novel tape-like recording medium (2)

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The novel magnetic recording medium is to be explained in more detail below.

1. Lower Layer

The lower layer of the novel magnetic recording medium contains a finely divided isotropic magnetically soft pigment which is selected from $\gamma$-$Fe_2O_3$, $Fe_3O_4$ and a solid solution of these components and has a mean crystallite size, which is determined by X-ray diffractometry and where the (311) line is evaluated, of from 7 to 17 nm.

If the crystallite size falls below 7 nm, it is not possible to obtain in the lower layer tape magnetization which is sufficiently high to enable the effects of the present invention, in particular a flattening of the frequency response, to be achieved. If, on the other hand, the mean crystallite size exceeds 17 nm, the roughness of the surface of the lower layer and hence also of the surface of the upper layer is increased so that there is a large drop in output level over the total wavelength range.

The anhysteretic susceptibility $\chi_{anhyst}$ in the lower layer must be high at low applied magnetic field strengths; in particular, it should be greater than 7 at a field strength of 2 kA/m. The anhysteretic susceptibility is determined by simultaneously applying a constant signal field (e.g., the abovementioned 2 kA/m) and an alternating field whose initial amplitude must be at least sufficiently large that the magnetization during the first field cycle is on the main hysteresis loop. The alternating field is reduced to zero in steps of 0.25 kA/m per cycle. The resulting magnetization is divided by the constant signal field in order to calculate the susceptibility. The lower layer should have a coercive force $H_c$ of greater than 0 and less than 4 kA/m.

If the coercive force of the lower layer is greater than 4 kA/m, the signal level increases again at long wavelengths so that the novel advantageously flat frequency response does not occur.

The relative remanence SQ of the lower layer, defined as a quotient of remanent flux density and saturation flux density (Br/Bs), is from 0.02 to 0.09.

The size distribution of the magnetically soft pigment is not limited and in particular tends to be broad, i.e., the mean crystallite size is determined from the crystallite sizes of finer and coarser particles.

The magnetically soft pigments have a spherical, cubic or amorphous shape. Amorphous particles are particularly preferred.

In addition to the desired flat frequency response of the novel magnetic recording medium, the use of finely crystalline magnetically soft pigments of defined particle size in the lower layer has further advantages. These finely divided magnetically soft pigments are essential for very finely disperse dispersions, with the aid of which a very smooth lower layer can be produced if the addition of further pigments having considerably larger particle sizes is dispensed with.

Such a finely divided lower layer contains pores and is soft and readily deformable, with the result that great smoothness of the lower layer can be produced in the calendering stage. Moreover, disadvantageous phenomena, such as chain formation of the magnetically soft particles in a magnetic field and magnetic agglomeration, which are observable when magnetic material having relatively large crystallite size is used and lead there to disadvantageous effects with regard to the surface smoothness of the magnetic layer and the achievable RF level, are not detectable.

This finely divided lower layer forms a good base for a thin upper magnetic recording layer to be applied thereon.

Compared with other conventionally used lower layer pigments, in particular with acicular nonmagnetic iron oxides, the magnetically soft pigment in the lower layer of the novel recording medium is cheap to prepare and, in contrast to these, requires no high-temperature step in the preparation, with the result that sintering of the pigments in the preparation process is avoided. Consequently, the dispersibility of the lower layer pigments can be considerably improved, which in turn leads to smooth layers.

The magnetically soft pigment may also be surface-treated in order to improve its dispersing behavior. In particular, aluminum and/or silicon compounds are suitable and advantageous agents for the surface treatment.

Owing to the finely divided character of the pigment, its specific surface area (SSA) is increased. This specific surface area determined on the basis of the BET method is more than 70, in particular more than 100, $m^2/g$. This contributes toward greater porosity in the lower layer. By means of the adsorption on the large surface of the magnetically soft pigments and the greater pore volume in the lower layer it is possible, with identical layer thickness, for a larger amount of lubricant to be absorbed in the lower layer in comparison with particles having a larger particle size, which amount of lubricant can be gradually released to the upper layer during a long period of use of the magnetic recording media and thus keeps the friction of the magnetic layer low even on prolonged operation of the medium. The adsorption of more than 6, preferably more than 7, % by weight of lubricant can thus be achieved, based on the total weight of the pigments in the lower layer.

Regarding the advantageous effect of a large lubricant reservoir on the mechanical properties of the tape, reference may be made here to the lecture by H. Doshita at the TISD Conference on Dec. 3, 1997 in London.

The magnetically soft pigment in the lower layer of the novel recording medium has a pH of from about 7 to 10. This pH essentially corresponds to the pH of the magnetic pigments for the upper recording layer which are used in the medium and have a high coercive force, in particular of the metal pigments used there. The same or very similar binder and solvent systems can therefore advantageously be used both for the upper recording layer and for the lower layer, which leads to high compatibility of the two dispersions and simplifies the production of the medium.

1.1 Preparation of the Lower Layer Pigment:

The preparation of the very finely crystalline $Fe_3O_4$ or $\gamma$-$Fe_2O_3$ pigment or of a solid solution composed of these components can be effected by one or more of the processes described in the patents DE 26 42 383, 30 27 012, 44 27 821 or JP 57-175734, the disclosures of which are incorporated by reference herein in their entireties.

The starting materials used are iron(II) salts, iron(III) salts, alkali metal precipitating agents and oxidizing agents. The iron(II) salts usually used are $FeCl_2$ or $FeSO_4$. Suitable iron(III) salts are $FeCl_3$, $Fe_2(SO_4)_3$ or mixtures thereof. MgO, $MgCO_3$, CaO, $CaSO_3$, NaOH, KOH, $NH_3$, $Na_2CO_3$, $K_2CO_3$ and other basic water-soluble or sparingly soluble compounds are used as precipitating agents.

Depending on the Fe(III)/Fe(II) ratio present, an oxidizing agent is required in order to oxidize the total Fe(II) to Fe(III). Usually, atmospheric oxygen is used here, but the use of $O_2$, $O_3$, chlorine, $H_2O_2$ or nitrates is also possible.

The preparation of the magnetite itself on a nano scale is carried out as follows:

a) A mixture of a Fe(III) salt with a Fe(II) salt is initially taken in a reactor having a mechanism for thorough mixing. The Fe concentration is 30–70 g/l of Fe. The mixture contains 50–57 mol % of Fe(III).
b) This mixture is heated to the precipitation temperature which is from 30 to 60° C.
c) Precipitation s effected using an alkaline precipitating agent in the course of 10–60 minutes. The amount of the precipitating agent is from 100 to 110% of the stoichiometric amount. The concentration is 2–10 equivalents per liter of solution.

d) Usually, a short after-treatment is carried out with an oxidizing agent, usually atmospheric oxygen, in order to oxidize the total Fe(II).

e) If it is desired to prepare $\gamma$-$Fe_2O_3$ in suspension, a longer oxidation is required. Here, a higher volume flow rate of atmospheric oxygen is also set and the suspension can be heated to 50–90° C.

The product obtained is usually filtered, washed and spray-dried.

In addition to said magnetically soft pigment, the lower layer in the novel magnetic recording medium may also contain further pigments, preferably inorganic nonmagnetic pigments.

These are as a rule pigments which improve the electrical conductivity and/or the mechanical properties of the layer. Examples of these are carbon black, graphite, tin oxide, silver powder, silver oxide, silver nitrate, copper powder or metal oxides, such as zinc oxide, barium sulfate and titanium dioxide. Carbon black or graphite is preferably used.

However, finely divided $\alpha$-$Fe_2O_3$ pigments, $\alpha$-FeOOH pigments or chromium oxides, preferably chromium oxide/hydroxide pigments having a core-shell structure, can also be added as further pigments.

These pigments can be used individually or as a mixture. Preferably, carbon black is used alone or as a mixture of carbon black and a further inorganic pigment.

The mean particle size of the further inorganic powder is in general from 5 to 350 nm and its specific surface area is from 30 to 200 $m^2/g$. Both acicular nonmagnetic pigments having a mean longitudinal axis of from 5 to 200 nm and spherical or amorphous nonmagnetic pigments having a mean particle size of from 5 to 350 nm may be used.

The magnetically soft pigment in the lower layer is used in a high concentration, in particular in an amount of more than 45, preferably more than 75, % by weight, based on the weight of the total pigments present in the lower layer.

The pigments described above are used in the lower layer with a polymeric binder. The type of binder is not limited; rather, all conventionally used binders known per se are suitable. Polyurethanes and/or vinyl chloride copolymers are preferably used and can also be employed in combination with further polymeric binders and/or dispersants.

In a particularly preferred embodiment, these polymeric binders have polar groups, for example sulfonate groups or phosphate groups, with the result that the dispersibility of the pigments present in the dispersion is advantageously influenced.

The dispersants used are the conventional dispersants, such as fatty acids or metal salts, but also polymeric, binder-containing components having a larger number of polar groups.

Moreover, the lower layer can also contain further different additives which are generally used, for example lubricants, crosslinking agents or antistatic agents.

Suitable lubricants are all generally used lubricants, in particular the frequently used fatty acids or fatty esters.

The crosslinking agents usually used are polyisocyanates.

Antistatic agents are the anionic, cationic or natural wetting agents known from the prior art, as well as the abovementioned powders for improving the electrical conductivity of the layer.

For the preparation of the dispersion of the lower layer, the magnetically soft pigments are mixed with the binders, the further inorganic pigments and all other additives together with a preferably organic solvent and are dispersed.

The organic solvents used may be any conventionally used solvents known from the prior art, in particular tetrahydrofuran, methyl ethyl ketone, cyclohexanone or dioxane, or mixtures of two or more thereof.

Upper Layer

The novel magnetic recording medium comprises an upper thin magnetic recording layer.

The ferromagnetic pigment contained in this layer is preferably a ferromagnetic metal pigment or metal alloy pigment in high concentration. These pigments contain, as main components, Fe, Ni and Co and furthermore, as required, Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Mn, Zn, Sr or B, individually or as a mixture, and may have on their surface a protective coating against oxidation and other harmful influences or for improving their dispersibility.

The metal powders or metal alloy powders are preferably acicular or spindle-shaped and have a specific BET surface area of 40–90 $m^2/g$, the mean axial length of the particles is not more than 200 nm, in particular not more than 120 nm, and the axial diameter is 10–30 nm. The axial ratio is from 2 to 20. The coercive force $H_c$ of these magnetic pigments is greater than 100 to 250, preferably 130–220, more preferably 140–205, kA/m. They have a high specific saturation magnetization $\sigma_s$ of from 115 to 170 emu/g.

The ferromagnetic pigment can however also be another, finely divided, magnetic pigment having a high coercive force. Known magnetic pigments having a hexagonal ferrite structure, in particular barium ferrites or strontium ferrites, which can also contain small amounts of foreign metals, such as Ti, Co, Ni, Zn, V or the like, are primarily suitable for this purpose.

These pigments are preferably finely divided lamella pigments having a mean particle size of from about 20 to 120 nm and an axial ratio of from 2 to 10. Their coercive force $H_c$ is from about 100 to 190 kA/m. They have a specific saturation magnetization of 30–70 emu/g.

Furthermore, acicular or spindle-shaped and isotropic, Co-modified $\gamma$-$Fe_2O_3$, Co-modified $Fe_3O_4$ or solid solutions thereof, having a $H_c$ of 80–180 kA/m and a saturation magnetization of 50–100 emu/g, can also be used as magnetic pigments of the upper layer.

These magnetic pigments are known per se and can be prepared by various processes, such as conventional known processes.

In addition to the magnetic pigment having a high coercive force, the magnetic recording layer can also contain nonmagnetic pigments which serve, for example, as abrasives or supporting pigments, such as $\alpha$-$Fe_2O_3$, $Cr_2O_3$, $TiO_2$, $SiO_2$, $Al_2O_3$, $BaSO_4$, boron nitride, $SnO_2$, $CaCO_3$, $ZrO_2$, TiC, SiC, $Sb_2O_3$, ZnO, $CeO_2$ or the like. In order to improve their dispersibility, these pigments may be subjected to surface treatment.

Furthermore, the upper magnetic layer may also contain the $\alpha$-FeOOH pigments or chromium oxide/hydroxide pigments having a core-shell structure, which have been stated above for the lower layer.

These pigments are used in the upper magnetic recording layer with a polymeric binder. Suitable binders are all binders described above for the lower layer.

The weight ratio of magnetic pigment to binder or the proportion of the magnetic pigment based on the total amount of pigment in the upper layer is from 3:1 to 7:1, or from 80 to 93%.

Further additives may be known and conventionally used dispersants, compositions for improving the electrical conductivity of the layer, lubricants, crosslinking agents and antistatic agents. The type of compounds used corresponds to the type of compounds employed for these purposes for the lower layer.

For the preparation of the dispersion for the upper magnetic recording layer, the magnetic pigments are mixed with the binders, the further inorganic nonmagnetic pigments, if required the carbon black and the other additives together with a preferably organic solvent and are dispersed. The organic solvents used are the solvents stated above for the lower layer.

2. Substrate

Suitable nonmagnetic substrates for the novel magnetic recording medium are all conventional commonly used substrate materials without restriction. In particular, the known flexible substrates, such as films of polyesters, for example polyethylene terephthalate or polyethylene naphthalate, and polyolefins, cellulose triacetate, polycarbonates, polyamides, polyimides, polyamidoimides, polysulfones, aramids or aromatic polyamides are especially suitable. However, rigid substrates comprising metals, glass or ceramic materials may also be used.

3. Production of the Novel Recording Medium

The process for the preparation of the dispersions for the upper and lower layers is known per se and comprises at least one kneading stage, a dispersing stage and, if required, a mixing stage, which may be provided before or after the abovementioned stages. The respective stages may each be composed of two or more steps.

In the preparation of the composition, all starting materials, i.e., the abovementioned components of the respective dispersions for the upper and lower layers, can be added to the reactor unit right at the beginning of the process or later on in the course of the process. The crosslinking agent and, if required, a crosslinking catalyst are preferably added after the end of the preparation of the dispersion.

After fine filtration through narrow-mesh filters having a size of not more than 5 $\mu$m, the dispersions are applied to the nonmagnetic substrate by means of a conventional coating apparatus at speeds in the conventional range, oriented in a magnetic field, if necessary in a preferred direction, dried and then subjected to a calender treatment and if necessary to a further surface-smoothing treatment.

The preferred direction for the magnetic field treatment may be along the application direction of the dispersion or tilted up to an angle of 35° relative to the direction. However, it is also possible to carry out a magnetic field treatment with the object of producing two-dimensionally or three-dimensionally isotropic orientation of the magnetic particles.

For the production of the novel magnetic recording media, coating can be effected by means of bar coaters, knife coaters, blade coaters, extrusion coaters, reverse-roll coaters or combinations thereof.

The layers can be applied simultaneously or in succession by the wet/wet method or by the wet/dry method. A wet/wet application method is particularly preferred since this facilitates the application of a thin upper layer.

A knife coater which has at least one outlet orifice, preferably two or more outlet orifices, and is disclosed in DE-A-195 04 930, the disclosure of which is incorporated by reference herein in its entirety, is preferably used for the production of the novel magnetic recording medium.

An extrusion coater having at least one outlet orifice, preferably two or more outlet orifices, is also suitable, the edge or the air gap of a magnet being opposite the orifices, on the other side of the flexible substrate, and the field lines of said magnet being essentially parallel to the running direction of the substrate. Such arrangements are disclosed in EP-A-0 654 165 or FR 2 734 500, the disclosures of which are incorporated by reference herein in their entireties.

After the drying and calendering, which follow the coating, the magnetic recording medium thus obtained is cut or punched into the desired form for use and is subjected to the conventional electromagnetic and mechanical tests.

The novel magnetic recording medium preferably is composed of a nonmagnetic substrate, a lower magnetic layer having the abovementioned composition and an upper magnetic recording layer having the abovementioned composition.

The thickness of the lower magnetic layer is from 0.5 to 3 $\mu$m, preferably from 0.5 to 1.5 $\mu$m.

The thickness of the upper magnetic recording layer is less than 0.5 $\mu$m, in particular less than 0.3 $\mu$m, preferably from 0.15 to 0.25 $\mu$m.

Both layers may comprise individual layers or a composite of in each case a plurality of layers, provided that the total thickness of the upper and lower layers remains in the abovementioned range.

It is possible for the back of the nonmagnetic substrate to be coated with the same layer composition as described above.

It is also possible to apply a backing coating known from the prior art and having a generally used composition to the back of the nonmagnetic substrate.

An adhesion-promoting layer may also be applied between the nonmagnetic substrate and the lower layer which contains the magnetically soft pigment. These layers can each be applied separately or they can be applied simultaneously or in succession with the upper and lower layers described above.

The magnetic recording medium of the present invention has very good electromagnetic recording properties in the total wavelength range and possesses a flat frequency response. It furthermore exhibits high porosity in the lower layer, which permits the absorption of large amounts of lubricant and hence leads to better mechanical durability. The novel recording medium can moreover be produced in a simple manner. This medium is therefore very useful for high recording densities and the recording of digital data.

The invention is illustrated by the following Examples, which are provided for the purpose of representation, and are not to be construed as limiting the scope of the invention. Unless stated otherwise, all percentages, parts, etc., are by weight.

EXAMPLE OF THE INVENTION

Production of the Magnetic Recording Medium

Upper Layer

A mixture of 100 parts by weight of a commercial ferromagnetic metal pigment having the main components Fe and Co ($H_c$ 187 kA/m, $\sigma_s$ 140 emu/g, SSA 55 m$^2$/g, mean particle length 85 nm), 13 parts by weight of $\alpha$-Al$_2$O$_3$ (diameter of primary particles 180 nm), 10 parts by weight of a PVC copolymer (Mn 11 000, Tg 68° C., containing sulfonate groups), 3.5 parts by weight of a PES-PU copolymer having dispersing activity (from Morton, Mn 20 000, containing sulfonate groups), 2 parts by weight of stearic acid, 1 part by weight of myristic acid and 15 parts by weight each of tetrahydrofuran and dioxane was kneaded in a batch kneader (IKA high-speed kneader of the type HKD 10, from IKA Maschinenbau, Staufen) for 2 hours.

The kneaded material was then mixed in portions with a mixture of 155 parts by weight each of tetrahydrofuran and dioxane in a dissolver with vigorous stirring and then dispersed for 10 hours using a stirred ball mill. 1 part by weight of butyl stearate, 4 parts by weight of a 50% strength solution of the reaction product of 3 mol of tolylene diisocyanate with 1 mol of trimethylolpropane in tetrahydrofuran and, in portions, a mixture of 44 parts by weight each of tetrahydrofuran and dioxane were then added to the dispersion with vigorous stirring. After filtration through a filter of 2 μm pore size, a homogeneous, finely divided, flocculate-free-dispersion for the upper layer was obtained, which dispersion was stable to settling and ready for application as a coat.

Lower Layer

A mixture of 100 parts by weight of a magnetically soft lower layer pigment stated in Table 1, 29 parts by weight of carbon black (average primary particle size 25 nm, SSA 115 m$^2$/g), 13 parts by weight of a PVC copolymer (Mn 11 000, Tg 68° C., containing sulfonate groups), 7.5 parts by weight of a commercial polyurethane having dispersing activity and polar anchor groups (from Morton, Tg 70° C.), 7.5 parts by weight of a second commercial polyurethane having polar anchor groups (Tg 35° C., from Morton), 2 parts by weight of stearic acid and 27 parts by weight each of tetrahydrofuran and dioxane was kneaded in a batch kneader for 3 hours.

The kneaded material was then mixed in portions with a mixture of 234 parts by weight each of tetrahydrofuran and dioxane in a dissolver with vigorous stirring and then dispersed for 15 hours in a stirred ball mill. 6.3 parts by weight of a 50% strength solution of the reaction product of 3 mol of tolylene diisocyanate with 1 mol of trimethylolpropane in tetrahydrofuran were then added to the dispersion with vigorous stirring. After filtration through a filter of 2 μm pore size, a homogeneous, finely divided, flocculate-free dispersion was obtained, which dispersion was stable to settling and ready for application as a coat.

Backing Coating 25.5 parts by weight of a mixture of tetrahydrofuran and dioxane in the ratio 1:1 were mixed with 1.2 parts by weight of a polyester/polyurethane binder in the form of a block copolymer, 0.44 part by weight of a polyvinyl formal, 0.6 part by weight of a polyolefin (Mw 3 000), 00.6 part by weight of an isomeric C18-carboxylic acid, 0.2 part by weight of dispersant, 3.4 parts by weight of a conductive carbon black, 0.87 part by weight of a precipitated silica and 0.29 part by weight of a supporting pigment. The polymeric binder components were first dissolved in a part of the solvent mixture. Dispersing was then carried out for 10–15 hours in a stirred ball mill.

In a second phase, a further 24.4 parts by weight of the solvent mixture, 1.4 parts by weight of the polyester/polyurethane binder in the form of a block copolymer, 0.73 part by weight of the polyolefin (Mw 3 000) and 0.04 part by weight of dispersant and additives were metered in. The polymeric components were likewise brought into solution beforehand in a part of the solvent. The mixture was then dispersed in a stirred ball mill or in a toothed colloid mill for thorough mixing. The dispersion thus obtained was mixed, in a final step immediately before the coating, with a further 13.4 parts by weight of the solvent mixture and with 1.8 parts by weight of a crosslinking agent.

Recording Medium

The dispersion for the backing coating was applied to the back of a polyethylene terephthalate film using a knife coater, so that a layer thickness of 0.5–1.5 μm was obtained after drying at 60°–80° C.

The upper and lower layer dispersions were applied wet-in-wet, by means of a dual knife coater, to the front of the polyethylene terephthalate film provided with a backing coating. The thickness of the upper magnetic layer containing metal pigment was as far as possible identical in every example, i.e. 0.25±0.03 μm, in order better to be able to shows the influences of the lower magnetic layer. In every example and comparative example, the metal pigment described above, which is conventionally used in magnetic recording media for the DVC system, was used for the upper layer.

In the layer thickness range of <0.5 μm for the upper layer, it was shown, in experiments not described here, that the thickness of the upper layer has only an insignificant effect on the magnetic lower layer. If, however, the thickness of the upper layer is substantially greater than 0.5 μm, in particular the desired flat frequency response of the recording medium can no longer be established. The thickness of the lower layer is stated in each case in Table 1. Before drying, the coated film was passed through a magnetic orientation zone consisting of a coil having a magnetic field strength of 200 kA/m for orientation of the ferromagnetic pigments. After drying at 80° C., the film web was calendered using a steel-steel calender with 6 gaps at 80° C. and at a nip pressure of 2,000 N/cm and was then slit into video tapes of different widths.

In order to characterize the tape properties achieved with the lower layer dispersions, each lower layer dispersion was applied to a PET film by means of a knife coater, oriented as above in a homogeneous coil field and dried. The resulting dry layer thicknesses were from 0.9 to 1.1 μm.

The magnetic properties of the tapes and of the lower layers were measured by means of a vibrating sample magnetometer having a maximum field strength of 400 kA/m. The lower layers were measured without calendering.

The recording properties and the signal level were determined in a modified Hi8 recorder as a still tester. The wavelength for the RF level was 0.49 μm, based on the DVC system, and the longer-wave F output level is determined at nine times this wavelength, i.e. at 4.4 μm. In order to detect the main effect of the invention, the flatter frequency response, a DVC tape produced in the standard manner and having a nonmagnetic lower layer is used as a reference tape. Its two output levels RF and F and hence also their difference RF–F are set at 0 (example n1). The desired flatter frequency response is then evident from the fact that F is substantially smaller than RF, i.e. the value RF–F is more positive.

Figure 2:
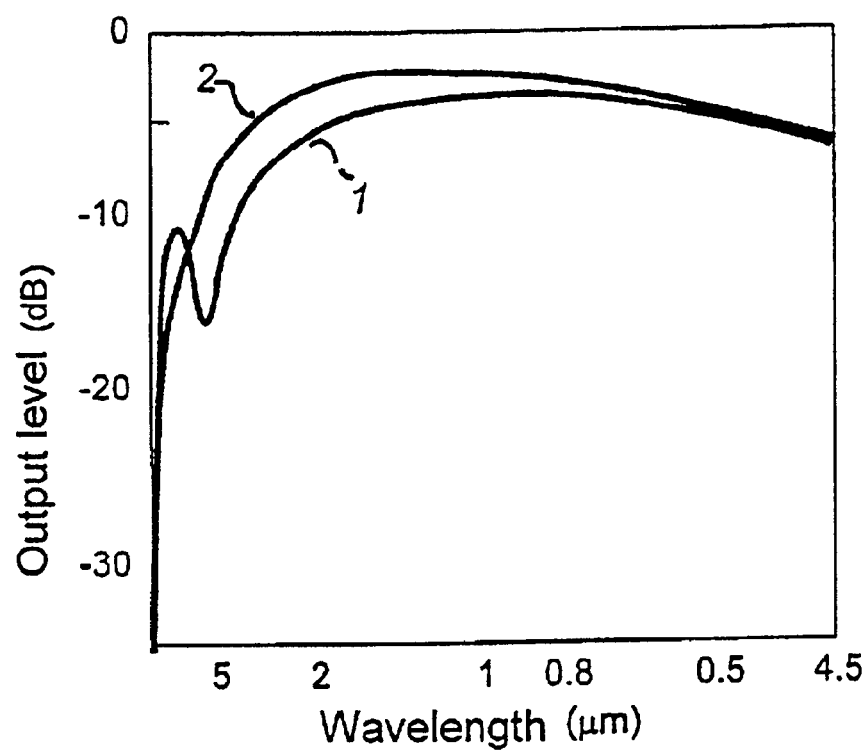
FIG. 2: shows frequency responses, measured on a loop drive, of a tape-like recording medium (1) having a magnetically soft lower layer according to the prior art and of a novel tape-like recording medium (2)

In order to monitor the fact that no inadmissible increase in output level occurs in the range of long wavelengths (λ>5 μm) owing to the special lower layer, the total frequency response of each double-layer tape is measured on a loop drive and investigated with respect to an increase in output level in the long-wavelength range. FIG. 2 shows such a measured curve.

The measurement of the crystallite size of the powder was carried out by the known standard method using a D5000 X-ray diffractometer from Siemens (X-ray tube copper, detector aperture 0.1 mm, divergence and scattered beam aperture variable, measuring rate 0.5°/minute). The (311) line was evaluated.

The following examples p1 to p3, table 1) show the results of the measurements on novel tape-like recording media having upper layers containing metal pigment. Lower layer pigments having different fine crystallinities of the composition shown in table 1 were used. In the case of example p2, as well as comparative example n2, the amount of stearic acid in the lower layer dispersion was doubled. In this way, the coefficient of friction was reduced by about 20% after continuous running for 3 weeks under humid and warm conditions (40° C., 85% r.h.).

In example p3, 40% of the amount of the magnetically soft lower layer pigments were replaced by commercial, acicular α-Fe$_2$O$_3$ standard for nonmagnetic lower layers. The flattening of the frequency response was reduced compared with the similar example p2 but was still clearly measurable.

TABLE 1

| | | Lower layer | | | | Tape | | |
| --- | --- | --- | --- | --- | --- | --- | --- | --- |
| | Pigment | | Thick- | | χ$_{anhyst}$ | | | |
| Example | d$_{cr}$ nm | Fe(II) % by wt. | ness μm | H$_c$ kA/m | (H = 2 kA/m) | SQ | RF dB | F dB | RF-F dB |
| p1 | 7.5 | 3 | 1.0 | 0.2 | 11.5 | 0.02 | −1.5 | −3.6 | 2.1 |
| p2 | 14.0 | 2 | 0.9 | 1.1 | 17.5 | 0.09 | −0.9 | −4.4 | 3.5 |
| p3 | 14.5/− | 2.− | 1.1 | 0.8 | 10 | 0.09 | −0.1 | −2.3 | 2.2 |

COMPARATIVE EXAMPLES (n1 TO n5)

Examples n1 to n4 describe experiments with recording media which have upper layers containing metal pigment and a magnetically soft lower layer (n1 nonmagnetic lower layer) having the composition shown in table 2, and in which, owing to values of d$_{cr}$, χ$_{anhysteretic}$ and H$_c$ not according to the invention, the desired substantially flatter frequency curve was not achieved. The values of RF–F were at least 1 dB below those of the novel recording media. In the case of example n5, both χ of the lower layer and the value RF–F were advantageously high, but an excessively high H$_c$ resulted in an undesired, increasing frequency response below 0.5 MHz (cf. FIG. 2).

TABLE 2

| | | Lower layer | | | | Tape | | |
| --- | --- | --- | --- | --- | --- | --- | --- | --- |
| | Pigment | | Thick- | | χ$_{anhyst}$ | | | |
| Example | d$_{cr}$ nm | Fe(II) % by wt. | ness μm | H$_c$ kA/m | (H = 2 kA/m) | SQ | RF dB | F dB | RF-F dB |
| n1 | — | 0 | 0.9 | 0 | 0 | 0 | 0 | 0 | 0 |
| n2 | 4.0 | 1 | 1.0 | 0.6 | 6 | 0.03 | −1.0 | −0.9 | −0.1 |
| n3 | 5.0 | 9 | 1.1 | 0.2 | 5 | 0.01 | −0.4 | −1.4 | 1.0 |
| n4 | 4.0/− | 9/− | 1.0 | 0.3 | 7 | 0.01 | −0.4 | −1.5 | 1.1 |
| n5 | 25.0 | 7 | 1.0 | 7.0 | 35 | 0.40 | −1.1 | −7.7 | 6.6 |

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

We claim:

1. A multilayer magnetic recording medium which comprises, on a nonmagnetic substrate, at least one upper binder-containing magnetic recording layer which has a thickness of less than 0.5 m and contains finely divided magnetic pigment having a coercive force H$_c$ of 80–250 kA/m, and at least one lower binder-containing layer which contains an isotropic magnetically soft pigment which comprises γ-Fe$_2$O$_3$, Fe$_3$O$_4$ or a solid solution of these components, the coercive force H$_c$ of the lower layer being less than 4 kA/m and the anhysteretic susceptibility of the lower layer at 2 kA/m being greater than 7, said isotropic magnetically soft pigment having a mean crystallite size of from 7 to 17 nm, a specific surface area determined on the basis of the BET method is more than 70 m$^2$/g, and a spherical, cubic or amorphous shape.

2. A magnetic recording medium as claimed in claim 1, wherein the magnetic pigment in the upper layer is a metal pigment or metal alloy pigment.

3. A magnetic recording medium as claimed in claim 1, wherein the magnetic pigment in the upper layer is a hexagonal ferrite pigment or a Co-modified γ-Fe$_2$O$_3$, a Co-modified Fe$_3$O$_4$ or a solid solution of these components.

4. A magnetic recording medium as claimed in claim 1, wherein the amount of the magnetically soft pigment in the lower layer is more than 45% by weight, based on the weight of all pigments in the lower layer.

5. A magnetic recording medium as claimed in claim 4, wherein the amount of the magnetically soft pigment in the lower layer is more than 75% by weight, based on the weight of all pigments in the lower layer.

6. A magnetic recording medium as claimed in claim 1, wherein the magnetically soft pigment in the lower layer has been surface-treated with an aluminum compound or with a silicon compound or with a mixture of the two compounds.

7. A magnetic recording medium as claimed in claim 1, wherein the lower layer contains at least one nonmagnetic pigment in addition to the magnetically soft pigment.

8. A magnetic recording medium as claimed in claim 7, wherein the nonmagnetic pigment is acicular, having a mean longitudinal axis of from 5 to 200 nm, or spherical or amorphous, having a mean particle size of from 5 to 350 nm.

9. A magnetic recording medium as claimed in claim 8, wherein the nonmagnetic pigment is $\alpha Fe_2O_3$.

10. A magnetic recording medium as claimed in claim 8, wherein the nonmagnetic pigment is carbon black.

11. A magnetic recording medium as claimed in claim 8, wherein the nonmagnetic pigment is a mixture of carbon black and $\alpha Fe_2O_3$.

12. A magnetic recording medium as claimed in claim 1, wherein the specific surface area of the magnetically soft pigment determined on the basis of the BET method is more than 100 $m^2/g$.

13. A magnetic recording medium as claimed in 1, wherein the coercive force $H_c$ of the pigment in the upper layer is from 130 to 220 kA/m.

14. A magnetic recording medium as claimed in claim 13, wherein the amount of the magnetically soft pigment in the lower layer is more than 45% by weight, based on the weight of all pigments in the lower layer.

15. A magnetic recording medium as claimed in claim 14, wherein the amount of the magnetically soft pigment in the lower layer is more than 75% by weight, based on the weight of all pigments in the lower layer.

16. A magnetic recording medium as claimed in claim 15, wherein the magnetically soft pigment in the lower layer has been surface-treated with an aluminum compound or with a silicon compound or with a mixture of the two compounds.

17. A magnetic recording medium as claimed in claim 13, wherein the lower layer contains at least one nonmagnetic pigment in addition to the magnetically soft pigment.

18. A magnetic recording medium as claimed in claim 17, wherein the nonmagnetic pigment is acicular, having a mean longitudinal axis of from 5 to 200 nm, or spherical or amorphous, having a mean particle size of from 5 to 350 nm.

19. A magnetic recording medium as claimed in claim 17, wherein the nonmagnetic pigment is $\alpha Fe_2O_3$.

20. A magnetic recording medium as claimed in claim 17, wherein the nonmagnetic pigment is carbon black.

21. A magnetic recording medium as claimed in claim 17, wherein the nonmagnetic pigment is a mixture of carbon black and $\alpha Fe_2O_3$.

22. A magnetic tape, magnetic card or floppy disk comprising a multilayer magnetic recording medium which comprises, on a nonmagnetic substrate, at least one upper binder-containing magnetic recording layer which has a thickness of less than 0.5 $\mu m$ and contains a finely divided magnetic pigment having a coercive force $H_c$ of 80–250 kA/m, and at least one lower binder-containing layer which contains an isotropic magnetically soft pigment which comprises $\gamma$-$Fe_2O_3$, $Fe_3O_4$ or a solid solution of these components, the coercive force $H_c$ of the lower layer being less than 4 kA/m and the anhysteretic susceptibility of the lower layer at 2 kA/m being greater than 7, said isotropic magnetically soft pigment having a mean crystallite size of from 7 to 17 nm, a specific surface area determined on the basis of the BET method is more than 70 $m^2/g$, and a spherical, cubic or amorphous shape.

23. A process for forming a multilayer magnetic recording medium which comprises, on a nonmagnetic substrate, at least one upper binder-containing magnetic recording layer which has a thickness of less than 0.5 $\mu m$ and contains a finely divided magnetic pigment having a coercive force $H_c$ of 80–250 kA/m, and at least one lower binder-containing layer which contains an isotropic magnetically soft pigment which comprises $\gamma$-$Fe_2O_3$, $Fe_3O_4$ or a solid solution of these components, the coercive force $H_c$ of the lower layer being less than 4 kA/m and the anhysteretic susceptibility of the lower layer at 2 kA/m being greater than 7, which comprises adding as the isotropic magnetically soft pigment in the lower layer at least one of $\gamma$-$Fe_2O_3$, $Fe_3O_4$ and a solid solution of these components, and which has a mean crystallite size of from 7 to 17 nm, said isotropic magnetically soft pigment having a specific surface area determined on the basis of the BET method is more than 70 $m^2/g$, and a spherical, cubic or amorphous shape.

24. A process for the production of a multilayer magnetic recording medium which comprises, on a nonmagnetic substrate, at least one upper binder-containing magnetic recording layer which has a thickness of less than 0.5 $\mu m$ and contains a finely divided magnetic pigment having a coercive force $H_c$ of 80–250 kA/m, and at least one lower binder-containing layer which contains an isotropic magnetically soft pigment which comprises $\gamma$-$Fe_2O_3$, $Fe_3O_4$ or a solid solution of these components, the coercive force $H_c$ of the lower layer being less than 4 kA/m and the anhysteretic susceptibility of the lower layer at 2 kA/m being greater than 7, said isotropic magnetically soft pigment having a mean crystallite size of from 7 to 17 nm, a specific surface area determined on the basis of the BET method is more than 70 $m^2/g$, and a spherical, cubic or amorphous shape, comprising:

mixing, kneading and dispersing of an isotropic magnetically soft pigment, selected from $\gamma$-$Fe_2O_3$, $Fe_3O_4$ or a solid solution of these components, a binder, a solvent and further additives and applying the dispersion to a nonmagnetic substrate to form a moist lower layer;

mixing, kneading and dispersing a finely divided magnetic pigment having a coercive force $H_c$ of 80–250 kA/m with a binder, a solvent and further additives and applying the dispersion to the lower layer for form a moist upper magnetic recording layer;

orienting the moist layers in a magnetic field;

drying the moist layers until the upper layer reaches a thickness of less than 0.5 $\mu m$; and subsequent calendering and separating, so that the coercive force of the lower layer is less than 4 kA/m and the anhysteretic susceptibility of the lower layer at 2 kA/m is greater than 7.

* * * * *